United States Patent Office 3,544,534
Patented Dec. 1, 1970

3,544,534
METHOD FOR POLYMERIZING OLEFINS
Yoshio Kadowaki and Hayao Shimokawa, Tokyo, and Kazuaki Yoshida and Eisuke Saito, Yokohama, Japan, assignors to The Furukawa Electric Company Limited, Tokyo, Japan
No Drawing. Filed Dec. 21, 1967, Ser. No. 692,606
Claims priority, application Japan, Apr. 28, 1967, 42/27,265
Int. Cl. C08f 1/66, 3/06
U.S. Cl. 260—88.2         18 Claims

ABSTRACT OF THE DISCLOSURE

Polymerization of ethylene or a mixture of ethylene and α-olefins by contacting said ethylene or mixture with a catalyst obtained by compounding an oxide of transition metal of Group Va or VIa of the Periodic Table and a salt of alkali or alkaline earth metal to a carrier consisting of alumina or mainly of alumina and reducing these substances partially, which is combined with at least one promoter of alkali metals, alkaline earth metals, or hydrides, complex hydrides or carbides of these metals. This catalyst may be further activated by effecting halogenation after the reduction. The resulting olefin polymers have a low content of the internal trans vinylene double bond in the unsaturated double bonds and an improved weather resistance and are inexpensive.

---

The present invention relates to an improved method for polymerizing ethylene or a mixture of ethylene and α-olefin, and an improved catalyst to be used for the polymerization.

It is an object of the present invention to provide a method for producing polyolefin having an excellent weather resistance.

Another object of the present invention is to provide a commercially useful method for producing polyolefin.

Further object of the present invention is to provide a useful catalyst having high activity for producing polyolefin having an excellent weather resistance.

Heretofore, U.S. Patent Nos. 2,691,647 and 2,692,257 disclose that in order to obtain olefin polymers having high molecular weight, ethylene or a mixture gas of ethylene and propylene etc. is contacted with a catalyst of an oxide of the transition metal of Group Va or VIa of Periodic Table supported on a carrier such as active alumina and a promotor of alkali metals etc. It has been found that when commercially useful ethylene polymers having suitable molecular weight for producing shaped articles or films etc. are produced in these processes, the content of the internal trans vinylene double bond (hereinafter abridged as "trans vinylene") in the unsaturated double bonds of the resulting polymer is high.

Although it cannot be avoided that polyethylene and ethylene-propylene copolymer contain unsaturated double bonds, if an amount of the trans vinylene in the polymer is high, the polymer is liable to be deteriorated by ultraviolet ray and it is not desirable in view of the weather resistance of the polymer.

Accordingly, an addition of an expensive ultraviolet ray absorber, such as 2-hydroxy-4-octoxy benzophenone, etc. or a hydrogenation of polymer has previously been effected, but these means require a cost in order to improve the weather resistance, and the products become expensive.

The present invention is different from these methods and is to provide a method for producing the polymers having a small amount of the trans vinylene, and an improved weather resistance.

The present inventors have made various investigations and found that the polymers having a small amount of the trans vinylene can be obtained by adding salt of alkali or alkaline earth metals to the polymerization catalyst.

Namely, the present invention is characterized in that a catalyst, which is obtained by compounding 1 to 50% by weight, preferably 5 to 30% by weight of an oxide of the transition metal of Group Va or VIa of the Periodic Table (hereinafter abridged as "the transition metal oxide") and 0.1–5.0% by weight of salt of alkali or alkaline earth metals (hereinafter abridged as "metal salt") to a carrier consisting of alumina or mainly of alumina (hereinafter abridged as "carrier") and reducing these substances partially, is combined with at least one promotor selected from the group consisting of alkali metals, alkaline earth metals and hydrides, complex hydrides and carbides of these metals (hereinafter abridged as "promotor") and the resulting catalyst system is contacted with ethylene or a mixture of ethylene and α-olefin (hereinafter abridged as "olefin"). The above mentioned percentage of each component is one based on the total amount of the catalyst.

Of course, the thus obtained catalyst can be used as such for the purpose, but the activity can be further activated by subjecting said catalyst to halogenation after the reduction.

The polyolefins produced in such a process are smaller in the amount of the trans vinylene in the polymer and have a highly improved weather resistance, particularly ultraviolet ray resistance, as compared with the polymers produced by using the conventional catalysts supporting only the transition metal oxide.

As the carrier of the present invention, use is made of alumina, alumina-silica, alumina-boria, alumina-chromia, alumina-titania etc. having a high surface area (40–400 m.$^2$/g.) and the content of silica, boria, chromia or titania therein is preferably less than 50% by weight, particularly less than 10% by weight.

Furthermore, as the transition metal oxide, use is made of $V_2O_5$, $MoO_3$, $CrO_3$ and the mixture thereof.

Such transition metal oxides have very low catalytic activity in an amount of less than 1% by weight and if the amount is more than 50% by weight, the catalytic activity is also very low and such an amount is not advantageous in economy.

As the metal salt according to the present invention, use may be made of inorganic acid salts or organic acid salts of alkali metals, such as lithium, sodium and potassium and alkaline earth metals, such as magnesium, calcium and barium, for example, sulfate, halide, carbonate, nitrate, phosphate and acetate of these metals.

As the amount of the metal salt compounded increases, the amount of the trans vinylene decreases, but if the amount is too large, the catalytic activity decreases. When an appropriate amount of the metal salt is compounded, the amount of the trans vinylene is considerably decreased as compared with the case wherein the metal salt is not compounded and further the catalytic activity increases by 30%. Therefore, by compounding an appropriate amount of the metal salt, the polymer having a small amount of the trans vinylene and an improved weather resistance can be obtained, and further the catalytic activity can be increased, so that the polymerization can be effected commercially inexpensively.

The deterioration of the polyolefin proceds in proportion to the amount of the trans vinylene and the improved polymer obtained by the catalyst improved by addition of the metal salt contains the trans vinylene of ½–⅓ of that of the nonimproved polymer. Therefore, the proceeding velocity of the deterioration due to ultraviolet ray is ½–⅓ as compared with the conventional catalysts not improved.

Further, the amount of polymer produced per unit weight of the catalyst is larger than that of the unimproved catalyst and the method according to the invention is remarkably improved commercially.

The amount of the metal salt to be compounded depends upon the kind of salt and the purpose, and such amount is preferably 0.1–5.0% by weight based on the total amount of the catalyst.

According to the present invention, a process for supporting the transition metal oxide on the carrier can be carried out in conventional known methods. Namely, an aqueous solution of a transition metal compound, which can form the transition metal oxide by thermal decomposition, is applied on the carrier by any means of impregnation, coprecipitation, cogelation, spraying and other means, and then the carrier applied such a solution is dried and calcined.

In the present invention, it is necessary that the metal salt is bonded with the carrier uniformly and tightly, so that the method for compounding the metal salt is effected in the same manner as described in the case for supporting the transition metal oxide. The metal salt can be compounded with the carrier before, during or after the transition metal oxide is supported on the carrier. For example, the carrier or the carrier supporting the transition metal oxide is impregnated with, dipped into or sprayed with a solution of the metal salt in water, and then the resulting mass is dried. Further, the catalyst may be produced by another method in which an acid and a base, which can form the above mentioned metal salt by a reaction, are added to the carrier separately, whereby the object metal salt is formed on the carrier, and then the resulting mass is dried or calcined.

According to the reduction of the invention, the carrier supporting the transition metal oxide and the metal salt is treated under a reductive gaseous atmosphere, such as carbon monoxide, hydrogen at a temperature of 300–600° C. for 0.1–5 hours to reduce the transition metal oxide partially.

The term "partial reduction" used herein means that the reduction is effected in the above described manner to such an extent that the valency of the transition metal is reduced to a slightly lower value than the maximum valency. For example, it is preferable that in the case of $MoO_3$ and $CrO_3$, the valency of these transition metals is reduced to 6–4 and in the case of $V_2O_5$, the valency of the transition metal is reduced to 5–3.

After the reduction, the thus obtained catalyst may be further subjected to halogenation treatment at 200–500° C. for 0.1–5 hours by using halogen, hydrogen halide, halogenated hydrocarbon, etc., whereby the catalyst is further activated. Further, the catalyst may be calcined at 300–600° C. prior to the reduction in order to bond the metal salt to the carrier sufficiently. In general, it is preferable to effect calcination, reduction and halogenation successively in order to increase the catalytic activity.

As the promotor of the present invention, use may be made of alkali metals, such as lithium, sodium and potassium, alkaline earth metals, such as magnesium and calcium, and hydrides, complex hydrides and carbides of these metals, and a mixture of two or more of the above substances.

Particularly sodium carbide ($Na_2C_2$) among these promotors has the following excellent features:

(1) Polymers containing a very small amount of the trans vinylene can be obtained.

(2) Polymers having a high whiteness can be obtained.
(3) The yield of polymers is high.
(4) The activity of the catalyst hardly changes during polymerization reaction.
(5) Ethane is not by-produced during the polymerization reaction.
(6) There is little danger of combustion in handling.

The weight ratio of the catalyst to be promotor is 1:0.01–10, preferably 1:0.1–1.

According to the polymerization reaction of the invention, the catalyst and the promoter are loaded into a reaction vessel together with a hydrocarbon solvent containing substantially no catalyst poisons, such as oxygen, water, sulfur compounds, etc., and then olefin is contacted with the catalyst system at 200–325° C. for several minutes to several hours under a pressure of olefin gas of 10–200 kg./cm.$^2$.

As the hydrocarbon solvent to be used for the polymerization, use may be made of aliphatic hydrocarbons, such as hexane, heptane, octane, nonane, decane, etc., aromatic hydrocrabons, such as toluene, xylene, etc., alicyclic hydrocarbons, such as cyclohexane, decalin, etc. and a mixture thereof.

The invention will be further explained in detail by the following examples.

EXAMPLE 1

Commercially available γ-alumina (manufactured by Sumitomo Chemical Co., grain size: 80–200 meshes, specific surface area: 280 m.$^2$/g.) was impregnated with a solution of ammonium molybdate and calcinated at 550° C. to obtain a molybdena-alumina, the content of molybdenum oxide of which was 15% by weight. Solutions of soduim chloride in water were prepared so as to obtain catalysts containing sodium chloride in an amount as shown in the following Table 1 when the catalysts were prepared. Then the molybdena-alumnia was impregnated with the solutions, dried, calcined at 450° C. for 2 hours, and further reduced under hydrogen atmosphere at 450° C. for 1 hour. Then 1 g. of the thus obtained catalyst and 0.3 g. of metallic sodium were loaded into an autoclave of 1 l. capacity equipped with a stirrer together with 500 cc. of decalin. After air in the autoclave was purged with gaseous nitrogen, the autoclave was heated up to 270° C. and ethylene was introduced into the autoclave and reacted for 1 hour, while keeping this temperature, stirring and maintaining the pressure of ethylene at 50 kg./cm.$^2$ in gauge. After the reaction, the content in the autoclave was poured out on a hot filter to separate the catalytic component, and the filtrate was cooled to precipitate the reaction product, which was washed thoroughly with hexane and dried at 70° C. under a reduced pressure for 24 hours to obtain white powdery polyethylene. Then, the powdery polyethylene was hot-pressed into a film and infrared absorption spectrum was measured to analyse the composition of unsaturated double bonds in the obtained polyethylene. The results are shown in Table 1.

TABLE 1

| Amount of NaCl added (percent by weight) | Yield of polymer (g.) | Total amount of double bond per 1,000 carbon atoms | Rate of respective double bond (percent) | | |
|---|---|---|---|---|---|
| | | | Trans vinylene | Terminal vinyl | Vinylidene |
| None | 19.5 | 2.07 | 85 | 12 | 3 |
| 0.3 | 26.6 | 2.19 | 45 | 53 | 2 |
| 0.6 | 25.8 | 2.01 | 33 | 64 | 3 |
| 1.0 | 22.4 | 2.09 | 28 | 70 | 2 |
| 2.0 | 11.0 | 2.63 | 23 | 75 | 2 |

EXAMPLE 2

A polymerization reaction was effected in the same manner as described in Example 1, except that a catalyst added with 1% of NaCl was used and 0.4 g. of sodium carbide ($Na_2C_2$) was used instead of the metallic sodium promotor. The yield of polyethylene was 25.5 g. The total amount of double bond in the polyethylene was 1.90 per 1000 carbon atoms and the trans vinylene therein was 19%. The polyethylene thus obtained had extremely higher whiteness than that of the polyethylene prepared by using metallic sodium promotor in Example 1.

After the reaction was completed, unreacted gases in the autoclave were analysed to find that the ethane content was 0.08%. When the promotors other than sodium carbide were used, unreacted gases contained generally about 1% of ethane.

In this reaction the polymerization rate could be maintained substantially constant from the beginning to the end. On the contrary, in Example 1 using the promotor of metallic sodium, the polymerization rate in the reduction end was decreased to about 70% of the initial rate.

EXAMPLE 3

Into a solution of 6.20 g. of ammonium paramolybdate, 0.2 g. of potassium hydroxide and 0.10 cc. of 85% phosphoric acid in 500 cc. of distilled water were dipped 30 g. of alumina-boria ($B_2O_2$ content: 15% by weight, specific surface area: 210 m.$^2$/g.) and the excess water was evaporated. The resulting mixture was calcined at 500° C. for 2 hours in air and further reduced at 450° C. for 1 hour under hydrogen atmosphere. With the use of 1 g. of the thus obtained catalyst and 0.5 g. of lithium aluminium hydride, ethylene was polymerized under the same polymerization condition as described in Example 1 to obtain 21.2 g. of white powdery polyethylene. The total amount of double bond in the polyethylene was 2.20 per 1000 carbon atoms and the trans vinylene content based on the total amount of double bonds was 35%.

Furthermore, for comparison, the polymerization reaction was effected in the same manner by using a catalyst prepared under the same condition as described in Example 3, except that potassium hydroxide and phosphoric acid were not added, to obtain 19.4 g. of white powdery polyethylene. The total amount of double bond in the polyethylene was 2.35 per 1000 carbon atoms and the trans vinylene content based on the total amount of double bond was 88%.

EXAMPLE 4

Solutions of 1 g. of various salts as shown in the following Table 2 in water were sprayed on 100 g. of the molybdena-alumina in Example 1 respectively. After calcined at 450° C., the resulting mass was reduced at 450° C. for 1 hour under hydrogen atmosphere, and immediately activated under gaseous hydrogen chloride atmosphere at 400° C. for 2 hours. Then ethylene was polymerized by using each 0.3 g. of the thus obtained catalysts and 0.2 g. of metallic sodium under the same condition as described in Example 1 to obtain a result as shown in the following Table 2.

TABLE 2

| Salt | Yield of polymer (g.) | Total amount of double bond per 1,000 carbon atoms | Rate of respective double bond (percent) | | |
|---|---|---|---|---|---|
| | | | Trans-vinylene | Terminal vinyl | Vinylidene |
| Na$_2$SO$_4$ | 50 | 1.10 | 21 | 76 | 3 |
| K$_2$SO$_4$ | 48 | 1.07 | 20 | 78 | 2 |
| LiCl | 75 | 1.01 | 38 | 59 | 3 |
| NaCl | 54 | 1.00 | 28 | 70 | 2 |
| KCl | 45 | 1.14 | 31 | 65 | 4 |
| CaCl$_2$ | 55 | 0.81 | 36 | 63 | 1 |
| NaF | 51 | 1.01 | 30 | 68 | 2 |
| NaBr | 78 | 1.20 | 35 | 60 | 5 |
| NaI | 46 | 0.97 | 36 | 63 | 1 |
| None | 48 | 1.11 | 85 | 12 | 3 |

EXAMPLE 5

Thirty grams of the same γ-alumina as used in Example 1 were impregnated with a solution of 4.29 g. of ammonium metavanadate and 0.50 g. of sodium sulfate in 100 cc. of water. The resulting mass was calcined at 550° C. for 2 hours, then reduced at 300° C. for 30 minutes under hydrogen atmosphere, and immediately activated at 300° C. for 1 hour under gaseous hydrogen chloride atmosphere.

The polymerization reaction and the after-treatment were effected under the same condition as described in Example 1, except that the polymerization reaction was effected at a temperature of 250° C. for 4 hours by using 1 g. of the thus obtained catalyst and 0.6 g. of calcium hydride, to obtain 16 g. of white powdery polyethylene. In this polyethylene, the trans vinylene content based on the total amount of double bond was 24%.

For comparison, the polymerization reaction was effected in the same manner as described in Example 5 by using a catalyst prepared in the same operation as described in Example 5, except that sodium sulfate was not added, to obtain 18 g. of polyethylene. The trans vinylene content was 71%.

EXAMPLE 6

Thirty grams of γ-alumina having a surface area of 190 m.$^2$/g. were impregnated with a solution of 6.20 g. of ammonium paramolybdate and 0.63 g. of sodium sulfate in 100 cc. of water, calcined at 500° C. for 2 hours, then reduced at 470° C. for 1 hour under hydrogen atmosphere, and immediately activated at 400° C. for 1 hour under gaseous hydrogen chloride atmosphere. Into an autoclave of 1 l. capacity equipped with a stirrer were loaded 0.5 g. of the thus obtained catalyst and 0.4 g. of sodium carbide together with 500 cc. of xylene. After air in the autoclave was purged with gaseous nitrogen, the autoclave was heated up to 250° C. and a gaseous mixture of 50 mole percent of ethylene and 50 mole percent of propylene was introduced into the autoclave and reacted for 2 hours, while keeping this temperature, stirring and maintaining the pressure of the mixture at 50 kg./cm.$^2$ in gauge. After the reaction, the content in the autoclave was poured out on a hot filter to separate the catalytic component, and the filtrate was cooled to precipitate the reaction product, which was washed thoroughly with hexane and dried at 70° C. under a reduced pressure for 24 hours to obtain 45 g. of white powdery ethylene-propylene copolymer. In the thus obtained copolymer, the total amount of double bond was 0.98 per 1000 carbon atoms and the trans vinylene content was 18%.

For comparison, the polymerization reaction was effected in the exactly same manner as described in Example 6 by using a catalyst prepared in the same operation as described in Example 6, except that sodium sulfate was not added, to obtain 40 g. of ethylene-propylene copolymer. The total amount of double bond was 1.05 per 1000 carbon atoms and the trans vinylene content was 67%.

EXAMPLE 7

Into a solution of 1.5 g. of potassium fluoride in 100 cc. of distilled water were dipped 30 g. of silica-alumina (manufactured by Mizusawa Chemical Co., silica content: 10%, specific surface area: 340 m./g., grain size: 80–200 meshes) and the mixture was stirred for 1 hour. After the supernatant liquid was decanted, the residue was introduced into a solution containing 6.20 g. of ammonium paramolybdate and the water was evaporated while stirring. The resulting mass was further calcined at 500° C. for 2 hours and then reduced under hydrogen atmosphere at 420° C. for 2 hours, and further activated under gaseous mixture atmosphere of hydrogen chloride and nitrogen at 350° C. for 2 hours.

The polymerization reaction was effected in the same manner as described in Example 1, except that 1 g. of the thus obtained catalyst was loaded into an autoclave of 10 l. capacity together with 0.4 g. of metallic sodium and 3 l. of decalin and the polymerization temperature was 260° C., to obtain 193 g. of white powdery polyethylene. The total amount of double bond in the polyethylene was 1.08 per 1000 carbon atoms, and the trans vinylene content based on the total amount of double bond was 14%.

For comparison, the polymerization reaction was effected in the same manner as described in Example 7 by using a catalyst prepared in the same operation as described above, except that the silica-alumina was not treated previously with potassium fluoride, to obtain 167 g. of white powdery polyethylene. The total amount of double bond was 1.11 per 1000 carbon atoms, and the trans vinylene content based on the total amount of double bond was 72%.

The deterioration test was made by Weather-O-Meter with respect to the above mentioned two samples. After 200 hours, the samples were taken out and absorption of carbonyl group at 5.8μ of each sample was measured by infrared spectrophotometer. The intensity of the absorption band in the polyethylene in the comparative example was 16.9 OD/dl., while the intensity in the polyethylene obtained by using the improved catalyst compounded with potassium fluoride was only 5.5 OD/dl.

The deterioration test was further continued and the time required for deteriorating the samples to such an extent that they were broken by bending was measured. The sample of the comparative example was broken after the deterioration of 220 hours, while in the polyethylene polymerized by using an improved catalyst compounded with potassium fluoride, the intensity of the absorption band due to carbonyl group reached 18.5 OD/dl after 580 hours, and the sample was broken.

As seen from the above mentioned examples, according to the present invention the polyolefin containing a small amount of the trans vinylene and having an excellent weather resistance can be produced in a high polymerization rate, so that the industrial significance of the invention is remarkable.

What is claimed is:

1. A method for polymerization which comprises combining a catalyst obtained by supporting 1 to 50% by weight of an oxide of transition metal of Group Va or VIa of the Period Table and 0.1 to 5.0% by weight of a salt selected from the group consisting of sulfate, halide and phosphate of a metal selected from the group consisting of lithium, sodium, potassium, magnesium, calcium and barium on a carrier consisting of alumina or mainly of alumina and treating the supported carrier with a reductive gaseous atmosphere selected from the group consisting of carbon monoxide and hydrogen at a temperature of 300 to 600° C. for 0.1 to 5 hours to reduce said oxide of transistion metal, with at least one promotor selected from the group consisting of alkali metals, alkaline earth metals and hydrides, complex hydrides and carbides of these metals and contacting the resulting combination with ethylene or a mixture of ethylene and α-olefin.

2. A method as claimed in claim 1, wherein the carrier consisting mainly of alumina is alumina-silica, alumina-titania, alumina-chromia, alumina-boria or the mixture thereof.

3. A method as claimed in claim 1, wherein the oxide of transition metal of Group Va or VIa of the Periodic Table is $V_2O_5$, $MoO_3$, $CrO_3$ or the mixture thereof.

4. A method as claimed in claim 1, wherein the amount of transition metal compounded is 5–30% by weight.

5. A method as claimed in claim 1, wherein the promotor is at least one metal or compound selected from the group consisting of lithium, sodium, potassium, magnesium, calcium, and hydride, complex hydride and carbide of these metals.

6. A method as claimed in claim 1, wherein the promotor is sodium carbide.

7. A method as claimed in claim 1, wherein the weight ratio of the catalyst to the promotor is 1.0:0.01–10.0.

8. A method as claimed in claim 1, wherein the weight ratio of the catalyst to the promotor is 1.0:0.1–1.0.

9. A method for polymerization, which comprises combining a catalyst obtained by supporting 1 to 50% by weight of an oxide of transition metal of Group Va or VIa of the Periodic Table and 0.1 to 5.0% by weight of a salt selected from the group consisting of sulfate, halide and phosphate of a metal selected from the group consisting of lithium, sodium, potassium, magnesium, calcium and barium on a carrier consisting of alumina or mainly of alumina and treating the supported carrier with a reductive gaseous atmosphere selected from the group consisting of carbon monoxide and hydrogen at a temperature of 300 to 600° C. for 0.1 to 5 hours to reduce said oxide of transistion metal and thereafter halogenating the thus treated carrier at a temperature of 200 to 500° C. for 0.1 to 5 hours by using halogen, hydrogen halide or halogenated hydrocarbon, with at least one promotor selected from the group consisting of alkali metals, alkaline earth metals and hydrides, complex hydrides and carbides of these metals and contacting the resulting combination with ethylene or mixture of ethylene and α-olefin.

10. A method as claimed in claim 9, wherein the carrier consisting mainly of alumina is alumina-silica, alumina-chromia, alumina-titania, alumina-boria or the mixture thereof.

11. A method as claimed in claim 9, wherein the oxide of transition metals of Group Va or VIa of the Periodic Table is $V_2O_5$, $MoO_3$, $CrO_3$ or the mixture thereof.

12. A method as claimed in claim 9, wherein the amount of transition metal compounded is 5–30% by weight.

13. A method as claimed in claim 9, wherein the promotor is at least one metal or compound selected from the group consisting of lithium, sodium, potassium, magnesium, calcium, and hydride, complex hydride and carbide of these metals.

14. A method as claimed in claim 9, wherein the promotor is sodium carbide.

15. A method as claimed in claim 9, wherein the weight ratio of the catalyst to the promotor is 1.0:0.01–10.0.

16. A method as claimed in claim 9, wherein the weight ratio of the catalyst to the promotor is 1.0:0.1–1.0.

17. A catalyst for polymerizing olefins, which comprises a catalyst obtained by supporting 1 to 50% by weight of an oxide of transition metal of Group Va or VIa of the Periodic Table and 0.1 to 5.0% by weight of a salt selected from the group consisting of sulfate, halide and phosphate of a metal selected from the group consisting of lithium, sodium, potassium, magnesium, calcium and barium on a carrier consisting of alumina or mainly of alumina and treating the supported carrier with a reductive gaseous atmosphere selected from the group consisting of carbon monoxide and hydrogen at a temperature of 300 to 600° C. for 0.1 to 5 hours to reduce said oxide of transition metal, and at least one promotor selected from the group consisting of alkali metals, alkaline earth metals and hydrides, complex hydrides and carbides of these metals.

18. A catalyst for polymerizing olefins, which comprises a catalyst obtained by supporting 1 to 50% by weight of an oxide of transition metal of Group Va or VIa of the Periodic Table and 0.1 to 5.0% by weight of a salt selected from the group consisting of sulfate, halide and phosphate of a metal selected from the group consisting of lithium, sodium, potassium, magnesium, calcium and barium on a carrier consisting of alumina or mainly of alumina, and treating the supported carrier with a reductive gaseous atmosphere selected from the group consisting of carbon monoxide and hydrogen at a temperature of 300 to 600° C. for 0.1 to 5 hours to reduce said oxide of transition metal and thereafter halogenating the thus treated carrier at a temperature of 200 to 500° C. for 0.1 to 5 hours by using halogen, hydrogen halide or halogenated hydrocarbon, and at least one promotor selected from the group consisting of alkali metals, alkaline earth metals and hydrides, complex hydrides and carbides of these metals.

References Cited

UNITED STATES PATENTS

| | | | |
|---|---|---|---|
| 2,825,721 | 3/1958 | Hogan et al. | 260—94.9 |
| 2,846,425 | 8/1958 | Hogan et al. | 260—93.7 |
| 3,105,066 | 9/1963 | MacKenzie | 260—93.7 |
| 3,145,196 | 8/1964 | Engel | 260—94.9 |
| 3,362,946 | 1/1968 | Hogan | 260—94.9 |

FOREIGN PATENTS 862,604   3/1961   Great Britain _____ 260—94.9

JOSEPH L. SCHOFER, Primary Examiner

E. J. SMITH, Assistant Examiner

U.S. Cl. X.R.

252—437, 440, 441; 260—94.9